United States Patent [19]
Turra et al.

[11] Patent Number: 5,333,988
[45] Date of Patent: Aug. 2, 1994

[54] DEVICE FOR SUPPLYING PRODUCTS ORDERED IN SERIES TO A SUCCESSIVE WORK STATION

[75] Inventors: Mario Turra, Casalecchio di Reno; Verter Cesari, Granarolo Emilia; Armando Neri, Bologna, all of Italy

[73] Assignee: G.D. S.p.A., Bologna, Italy

[21] Appl. No.: 940,295

[22] Filed: Sep. 3, 1992

[30] Foreign Application Priority Data

Sep. 11, 1991 [IT] Italy .................. BO91A 000320

[51] Int. Cl.⁵ ............................................. B65G 59/00
[52] U.S. Cl. .................... 414/795.8; 414/911; 414/908; 414/391; 414/277
[58] Field of Search .............. 414/795.8, 798.5, 798.7, 414/798.9, 911, 908, 391, 392, 277; 198/487.1, 803.12, 444, 577; 187/9 R; 53/168

[56] References Cited

U.S. PATENT DOCUMENTS

| | | | |
|---|---|---|---|
| 4,358,143 | 11/1982 | Cullen | 414/911 |
| 4,572,353 | 2/1986 | Felder | 198/577 |
| 4,589,811 | 5/1986 | Riccardo et al. | 414/911 |
| 4,720,797 | 1/1988 | Sommerfield et al. | 198/444 |
| 4,993,916 | 2/1991 | Dorner et al. | 414/798.7 |
| 5,135,103 | 8/1992 | Focke et al. | 414/911 |

FOREIGN PATENT DOCUMENTS

3529A90 5/1990 Italy.
2239651 7/1991 United Kingdom .................. 53/168

Primary Examiner—David H. Bollinger
Attorney, Agent, or Firm—Cushman, Darby & Cushman

[57] ABSTRACT

The device serves to convey products singly and in succession to a work station. For example rolls of strip material can be conveyed to a wrapping machine, or containers of cigarettes can be conveyed to a packaging unit. The device comprises a conveyor system by which products loaded into a magazine are supported and caused to advance from an infeed end of the magazine toward a mechanism, positioned at an outfeed end, which the transfers each product to a position within the work station. The movement of the conveyor system is reversible, and with a transfer mechanism installed at both the infeed and the outfeed end of the magazine, the contents can be emptied from either end without manual or machine assistance.

10 Claims, 1 Drawing Sheet

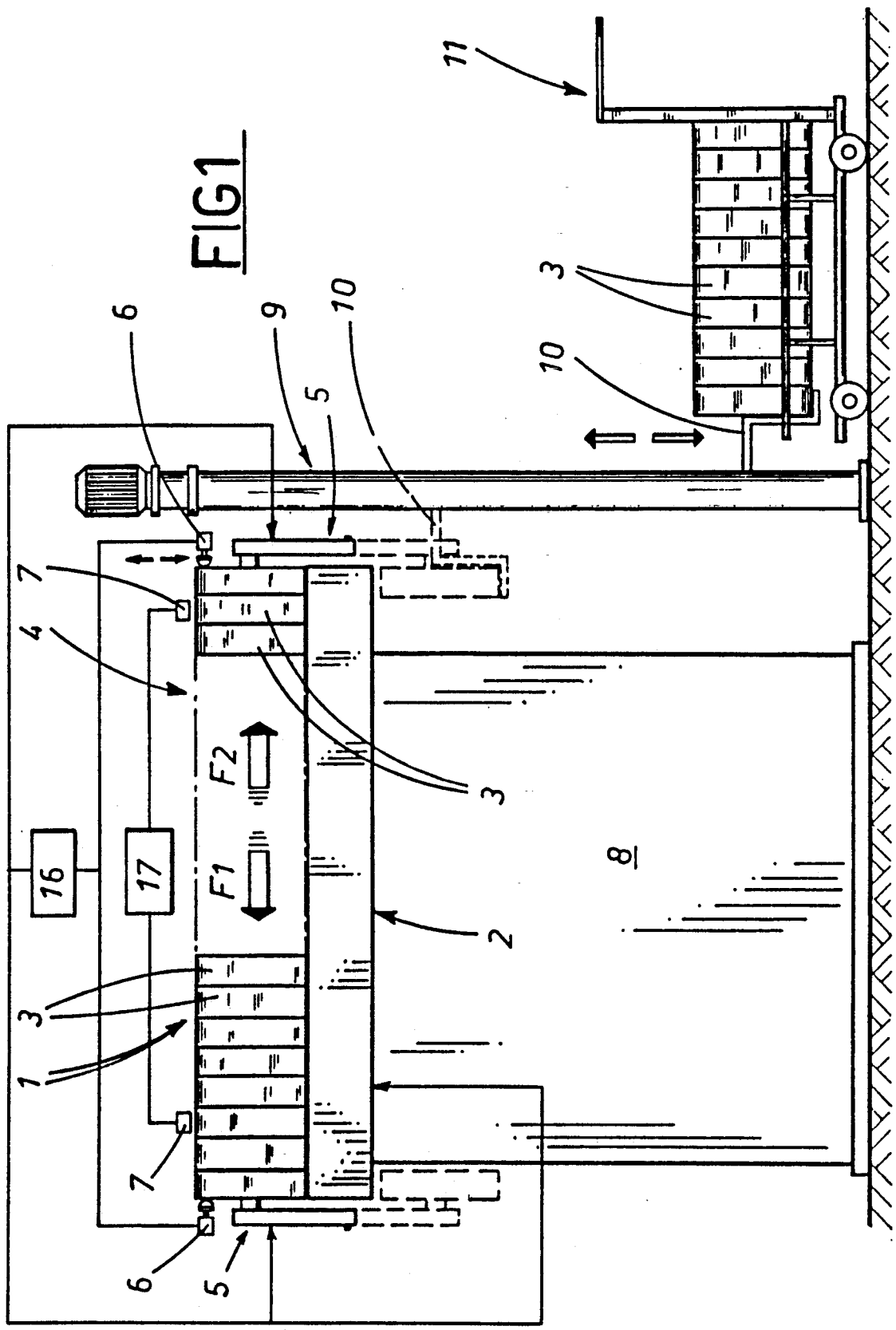

DEVICE FOR SUPPLYING PRODUCTS ORDERED IN SERIES TO A SUCCESSIVE WORK STATION

BACKGROUND OF THE INVENTION

The present invention relates to a device by which products ordered in series are supplied to a successive work station.

By way of example, the invention can be used to handle rolls of strip material, or stacks of die-cuts in a wrapping machine, or containers of cigarettes in a packaging machine. The prior art in the field of automatic machinery, and in particular of machines by which commodities are wrapped in strip material uncoiled from rolls, embraces the use of magazines capable of carrying a plurality of such rolls arranged side by side and supplying them automatically to a successive work station by way of a device of the type in question. The rolls are taken up singly and in succession from the magazine by a change mechanism, which transfers a new roll to the work station as the previous roll reaches total depletion. In this manner, a wrapping machine can be made to operate independently. A device for changing rolls of the type utilized in the machines mentioned above consists substantially in transfer means capable of movement from a first position, in which the roll to be transferred to the machine is taken up, and a second position from which the roll is uncoiled by the wrapping machine. Such transfer means take the form of an arm mounted pivotably about an axis disposed parallel to that along which the rolls occupying the magazine are coaxially aligned, of which one end carries a head serving to support the roll.

Magazines of the type in question are structured, complete with a relative feed mechanism, in such a way that the products are advanced toward transfer means operating at one end of the magazine.

Albeit such magazines perform the required function more than satisfactorily in the course of normal operation, serious difficulties are encountered whenever the need arises to empty the magazine of its contents, for example during routine servicing or following a breakdown.

Clearly, such difficulties become especially acute where, in the pursuit of manufacturing space conservation, the magazine containing the rolls is positioned at a high part of the machine, thus making more difficult to reach. The object of the present invention is to provide a conveying device which overcomes the drawbacks outlined above.

SUMMARY OF THE INVENTION

The stated object is realized in a device according to the present invention for conveying products ordered in series to a successive work station. The device can be used, for example, in a wrapping or packaging machine, comprising means by which the products are supported internally of a magazine and advanced from an infeed end of the magazine toward means, positioned at the outfeed end, by which the products are transferred singly from the magazine to a position of use in the successive work station. Advantageously, the movement of the means by which products are supported and advanced along the magazine can be reversed, and transfer means are installed and operational both at the infeed and at the outfeed end of the magazine in such a way that the magazine can be emptied of its contents from either end.

BRIEF DESCRIPTION OF THE DRAWING

The invention will now be described in detail, by way of example, with the aid of one accompanying drawing that provides a schematic representation of the device disclosed, viewed in side elevation, in an embodiment with the magazine occupying a high part of the machine, as aforementioned, and with loading means positioned at the infeed end of the magazine.

DESCRIPTION OF THE PREFERRED EMBODIMENTS

Referring to the accompanying drawing, 8 denotes a machine, typically a wrapping or a packaging unit. Numeral 4 denotes a magazine positioned above the machine 8 and occupied, in the example illustrated, by a plurality of rolls 3 of material arranged one beside the next in series and in coaxial alignment. The device according to the invention, denoted 1 in its entirety, is designed to operate in conjunction with such a magazine 4.

The device 1 comprises means 2 by which the rolls 3 are supported and advanced along the magazine 4 in a feed direction denoted F1, toward a position from which the first or leading roll 3 is taken up and transferred to the machine 8 by means denoted 5.

Also illustrated in the drawing is a loading device 9 of the type described, for example, in application no. 3529 A/90 for Italian patent, to which reference may be made for a full description. The loading device 9 is placed at the infeed end of the magazine 4 and comprises elevator means 10 by which rolls 3 are picked up singly and in succession from a trolley 11 and positioned on the support and feed means 2.

According to the present invention, the movement of the means 2 by which the rolls are supported and advanced along the magazine is reversible, as shown by the two arrows F1 and F2; moreover, the device 1 comprises transfer means 5 positioned and operating not only at the outfeed end of the magazine 4 but also at the infeed end.

The device 1 thus allows the magazine to be emptied of its contents, without manual intervention, from the infeed end as well as from the outfeed end. The example of the drawing, showing an arrangement in which the magazine 4 and the loading device 9, including the elevator means 10, are located above the machine 8, serves to emphasize the important advantage afforded by a device 1 such as will allow the magazine 4 to empty out from either end without assistance.

The device 1 further comprises sensing means 6 operating both at the infeed end and at the outfeed end of the magazine 4, which serve to detect the presence of a roll 3 in a position ready to be taken up by the transfer means 5, and thereupon to enable the step of transferring the roll 3.

The device also comprises second sensing means 7 designed to detect the presence of a given number of rolls 3, within the confines of the magazine 4, waiting to be taken up and transferred.

The outputs of the sensing means 6 first mentioned are connected to a single input of monitoring and control means 16, which is capable of piloting the stoppage of the support and feed means 2 on receipt of a signal from the sensing means 6. The same sensing means 6 are able to pilot the activation of the respective transfer means 5, likewise by way of the monitoring and control means 16.

The outputs from the second sensing means 7, on the other hand, are directed into the corresponding inputs of processing and analyzing means 17. One element of the sensing means 7 is positioned in an area normally occupied by the roll 3 next behind the leading roll and serves to count off the number of rolls taken up by the transfer means 5. Another element of the sensing means 7 is positioned preceding the first, in the feed direction, and serves to count off the number of rolls 3 loaded initially into the magazine. The function of the processing and analyzing means 17 is to process the signals received from the sensing means 7 and calculate the number of single rolls 3 currently occupying the magazine 4, and are able also to generate warning signals as the supply of rolls 3 runs low, thereby allowing the stock to be replenished before total depletion occurs.

What is claimed is:

1. A device for transferring products to a work station comprising:
    a magazine adapted to hold a plurality of products, said magazine having an infeed end and an outfeed end;
    means for advancing the products in a forward direction along the magazine from said infeed end toward said outfeed end during a normal transfer of the products to the work station, said advancing means being further capable of alternatively advancing the products in a reverse direction toward the infeed end;
    means for successively transferring each of said products from the outfeed end of the magazine to the work station during the normal transfer of the products; and
    further transfer means for removing the products from the infeed end of the magazine when the products are alternatively advanced in the reverse direction to the infeed end.

2. A device according to claim 1, further comprising sensing means for detecting the present of at least one of said products at a predetermined position relative to said successively transferring means, said sensing means being operable to generate an enabling signal to said successively transferring means so that said successively transferring means transfers the products from the outfeed end of the magazine to the work station.

3. A device according to claim 2, wherein said sensing means is further capable of detecting the present of at least one of said products at a predetermined position relative to said further transfer means to enable said further transfer means to remove the products from the infeed end of the magazine when the products are alternatively advanced in the reverse direction.

4. A device according to claim 1, further comprising second sensing means for detecting the number of said products within said magazine to be transferred by said successively transferring means.

5. A device according to claim 4, wherein said second sensing means generates a warning signal when the number of products within said magazine reaches a predetermined value.

6. A device according to claim 1, wherein said further transfer means is adapted to transfer the products to the infeed end of the magazine during the normal transfer of the products to the work station.

7. A device according to claim 6, wherein said products are transferred to said further transfer means by an elevator, said elevator being movable between a supply of the products and the further transfer means.

8. A device according to claim 7, wherein the supply of products is carried by a trolley.

9. A device according to claim 1, wherein the work station comprises a wrapping machine.

10. A device according to claim 1, wherein the work station comprises a packaging machine.

* * * * *